R. F. LUDLOW.

2 Sheets—Sheet 1.

CAR COUPLING.

No. 11,464.

Reissued Jan. 22, 1895.

Witnesses
Jas. C. Dawley
H. M. McNair.

Rodney F. Ludlow, Inventor
By his Attorney H. A. Toulmin

2 Sheets—Sheet 2.
R. F. LUDLOW.
CAR COUPLING.
No. 11,464.
Reissued Jan. 22, 1895.
Fig 3
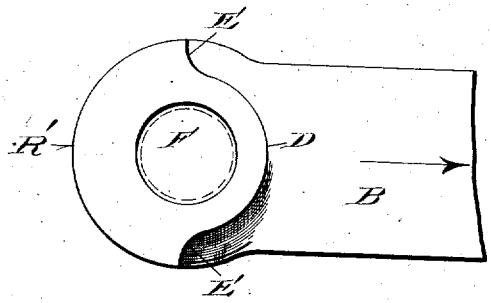
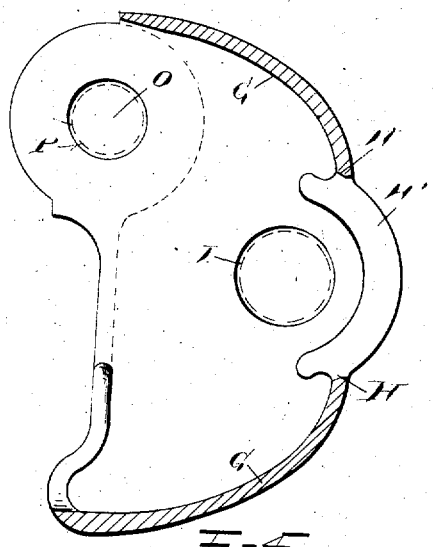
Fig 4
Fig 5
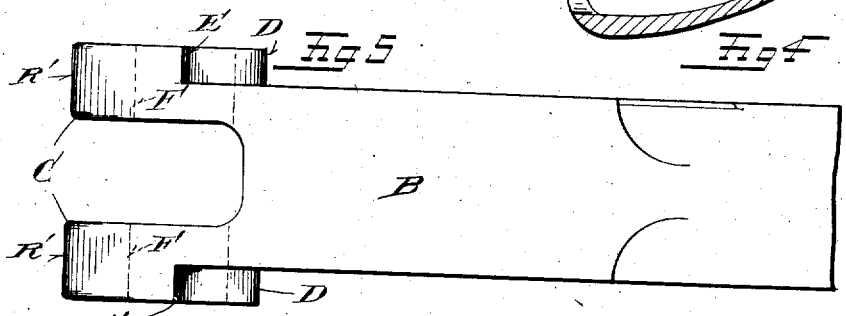
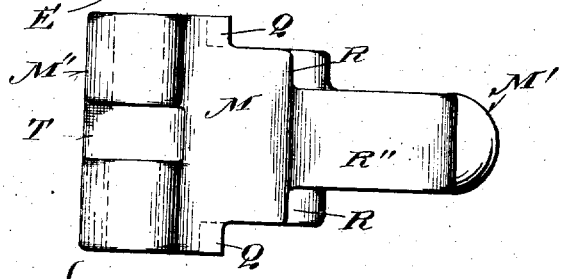
Fig 6
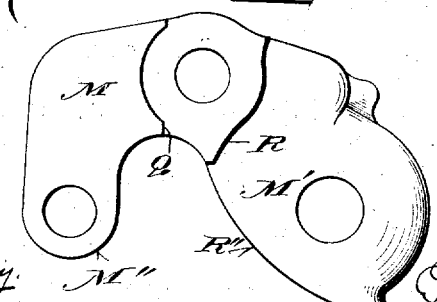
Witnesses
Jas. C. Rawley.
H. M. McNair.
Inventor
Rodney F. Ludlow,
By his Attorney
H. A. Toulmin.

UNITED STATES PATENT OFFICE.

RODNEY F. LUDLOW, OF SPRINGFIELD, OHIO.

CAR-COUPLING.

SPECIFICATION forming part of Reissued Letters Patent No. 11,464, dated January 22, 1895.

Original No. 515,346, dated February 27, 1894. Application for reissue filed November 5, 1894. Serial No. 527,945.

*To all whom it may concern:*

Be it known that I, RODNEY F. LUDLOW, a citizen of the United States, residing at Springfield, in the county of Clark and State of Ohio, have invented certain new and useful Improvements in Car-Couplers, of which the following is a specification, reference being had therein to the accompanying drawings.

This invention relates to certain new and useful improvements in car couplers, and the several distinctive features and characteristics will be hereinafter fully described and especially pointed out in the claims.

Figure 1:
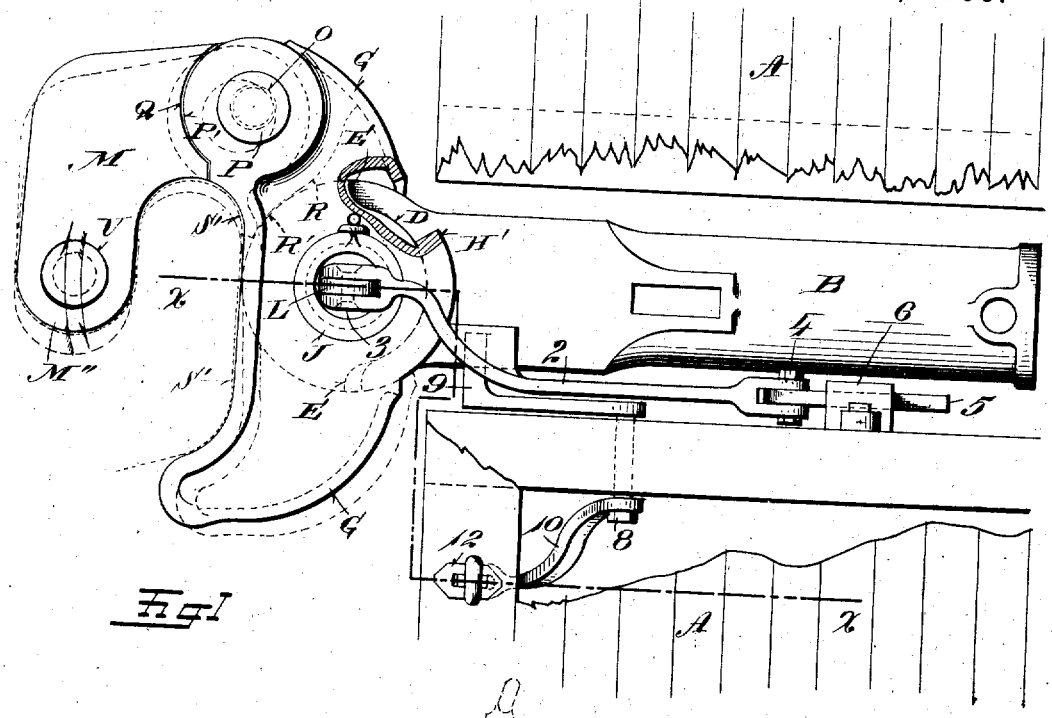
Figure 2:
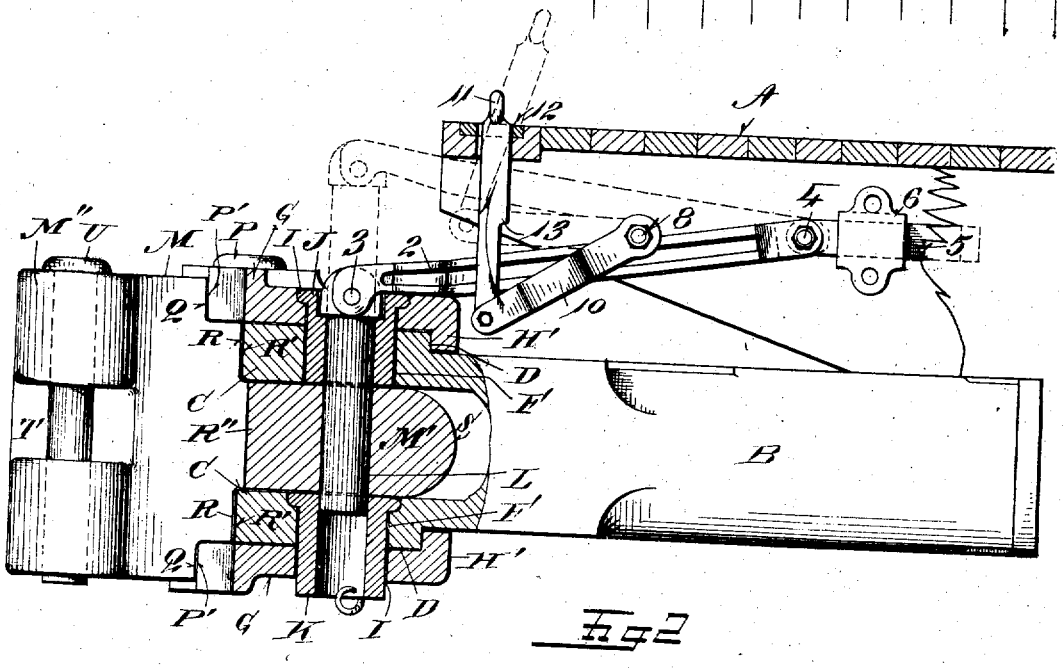

In the accompanying drawings on which like reference letters and numerals indicate corresponding parts: Figure 1, represents a plan view of my improved car coupler, with a portion of a car platform broken away; Fig. 2, a vertical sectional view on the line *x x* of Fig. 1; Fig. 3, a plan view of a portion of the draw-bar; Fig. 4, a horizontal sectional view of the draw-bar, into which the draw-bar is to be inserted; Fig. 5, a side elevation of the bar; and Fig. 6, a plan view of the knuckle in detail.

The letter A designates an ordinary platform of an ordinary passenger coach, and beneath this platform is mounted my improved coupler in the ordinary or any approved manner. When the coupler is used on freight cars it is also applied in the well known and approved manner.

The letter B designates the draw-bar proper, the forward end of which is divided into jaws C with a space between them into which swings the inner arm of the knuckle. On the upper side of the upper jaw and on the lower side of the lower jaw are formed bosses D. These bosses occupy the forward end of the jaws, are concentric with the pin-hole in their rear portion, and terminate at the points E. The pin-hole in the draw-bar is shown at F.

The letter G designates the draw-head, which is in the form of a shell, having upper and lower and side walls, and an interior which receives the forward end of the draw-bar and a portion of the knuckle. This head has an opening, shown at H, in its rear wall, and through this opening is projected the rear portion of the draw-bar. On the upper and lower walls of the draw-bar are formed flanges H′, of the same curvature as the rear portion of the bosses D on the draw-bar. Therefore when such shoulders are brought up against such flanges a joint is formed between the draw-bar and the bar, and this joint admits of lateral vibrations of the draw-bar with respect to the bar, while this overlapping of the parts prevents the head from being drawn off of the front end of the bar when the strains are brought upon the head. It will also be seen that the center from which these flanges and bosses are struck is on line with the longitudinal or draft center of the draw-bar. Hence this coupler is a central draft coupler in respect to the pivotal connection between the head and the bar. It is also a central draft coupler in respect to the point where the inner arm of the knuckle is fastened, as will presently appear. It will be understood that the bosses D and the shoulders H′ constitute the pivotal connection between the bar and the head, and that these stout parts being cast or made integrally with the bar and head respectively, are very strong and receive the essential strains which tend to pull the head from off the bar. Thus these two members of the device, the bar and the head, both of which are heavy structures, form in themselves the interlocking and pivotal connection between them. In the head I have also formed pin-holes, as shown at I, and into these pin-holes and the pin-holes of the bar I have placed thimbles J and K and into these thimbles I drop the pin L. The joint between the thimbles and the pin-holes is sufficiently loose to give play enough to allow the draft strains to be essentially resisted by the bosses and the flanges while at the same time the thimbles are ever ready to take up the strains should a breakage occur in the bosses or flanges or wear take place enough to make the head draw against the thimbles as pivots.

In the head is pivotally mounted the knuckle M. The head has a pivot opening O in the upper and lower walls and the knuckle has a corresponding pivot hole so that the pin P when dropped into these holes pivotally connects the knuckle with the head. There are two peculiarities about this knuckle and its connection with the head and its coaction with the bar. The first peculiarity is that the pin P has sufficient play in the pivot openings of the head and knuckle to give the knuckle a slight movement toward the head independently of the pivot; and the second peculiarity is formed with the shoulders Q and R, the former being adapted to come against the head at the shoulder P′ and the latter to come against the bar at the shoulder R′ when the knuckle is thrust inward by a blow from the coupler of the opposing car in the act of coupling. Such action occurs when the outer arm M″ of the knuckle M strikes the opposing coupler in the act of coupling. Thus the shearing action which would otherwise be severely brought against the pin P is transferred to the head and to the bar by the direct impingement of the knuckle against the head and bar in the act of coupling and at the same time when the blow takes place between the two couplers. This is important in its preservation of the pin P and in the resulting more perfect operation of the pin as a pivot upon which the knuckle may turn freely when the pivotal action of the knuckle is desired, the pin being always kept straight and not being bent by such blows. Again, the inner arm M′ of the knuckle strikes against the forward ends of the side walls of the bar, as shown at S, when the knuckle is thrust inward by a blow. Furthermore, when the outer arm shown in dotted lines in Fig. 1, at S′, (being the outer arm of the opposing knuckle) strikes before the arm M″ strikes, in the act of coupling, the blow is resisted by the shoulder R′ of the bar B because the inner arm M′ of the knuckle M has its wall R″ formed so as to set back from and inside of the shoulders R′ of the bar. Thus no matter whether the arm M″ of the knuckle strikes the opposing coupler before the arm S′ of the opposing knuckle strikes in the act of coupling, the blow in each case is resisted and sustained ultimately by the bar B, and the pivot devices are not subject to these heavy and destructive blows which tend to bend and shear the pivot devices. So it is seen that the shoulders P′ of the head, and R′ of the bar resist the blows suffered by the knuckle M, while the shoulders R′ of the bar suffer the blows struck by the incoming arm of the opposing knuckle. Of course the shoulders R of the head, being substantially in line with the shoulders R′ of the bar, are incidentally struck by the arm S′ of the incoming knuckle, but as after all the head G moves back with the bar B when the latter is struck, such incidental striking of the head does not make any difference; and such striking of the head will not happen should the shoulders R of the head be slightly back of the shoulders of the bar. The outer arm M″ of the knuckle is bifurcated, as seen at T, and is provided with a pin-hole for a pin U which may be used to couple with this coupler an ordinary link, in case the next car has the old fashioned link on it.

By referring to Fig. 1 it will be seen that the center of the pin U and the center of the connection between the head and the bar are on a line with the center of the draft line of the bar, so that when the link is used the strain and draft is what is known as a central draft. It will also be observed from this figure that when the strain is brought upon the arm M′ of the knuckle by the interlocking with it of the corresponding arm of the knuckle of the coupler of the next car the strain is likewise a central draft strain for the reason that the inner arm of the knuckle is fastened at a point coincident with the center of the bar. Moreover the center of the pivotal connection between the head and the bearing and the center of the connection of the inner end of the knuckle being coincident with the same, the head swings freely from side to side with the knuckle when the motion of the cars and going around curves create the slighest strain to either side of the central line, so that there is no conflict or eccentric action between the knuckle and the head tending to interfere with the free vibratory movement of the head on the bar in performing its important office of vibration in response to a deviation of the draft strains more or less at either side of the central line. Thus among the advantages and characteristics of my invention may be mentioned the pivotal connection between the head and the bar by means of portions of these parts themselves as distinguished from a mere pin; the central position of the pin which secures the inner arm of the knuckle and the coincidence of this position with the center of vibration between the head and bar; the resistance of the blows received by the knuckle in the act of coupling by the shoulders of the knuckle and head and the bar and finally, the insertible feature of the bar into and through the head as a practical and ready means of interlocking them.

I will now refer to my improved means of operating the pin L by which the inner arm of the knuckle is secured when my coupler is used on a passenger coach. An arm 2 is pivoted at 3 to the pin L and is pivoted at 4 to a slide 5 carried in a box 6, secured under the platform to a timber. The same timber carries a double armed rock-shaft 8, the arm 9 of which passes under the bar 2 and the arm 10 of which is connected with a lift piece 11 so that when the lift piece is raised by the arm 9, it lifts upon the arm 2 and thereby elevates the pin L, the arm 2 turning on its pivot 4, and the slide 5 working in a box 6 to compensate for the arc described by the arm 2 because of its moving on a pivot. A plate 12 let into the platform floor supports the lift piece when the shoulder 13 of the latter is brought thereon, as indicated by the dotted lines in Fig. 2. Thus supported the pin is held up and the couplers may be uncoupled. When the act of coupling takes place, the pin drops into the hole in the inner arm of the knuckle, as such hole passes under the pin, it being understood that the knuckle may form a support for the pin, by the latter merely resting thereon.

Should an accident occur and the head be stripped from the bar or indeed, should even the bar itself be stripped from the car, the bar 2 will draw the slide 5 out of the box 6 and then the bar 2 will draw along over the arm 9 and thus pass away from the car without being held back or hung to the platform. Thus it will be seen that the pin actuating mechanism is automatically detachable from the car itself.

Having thus fully described my invention, what I claim as new, and desire to secure by Letters Patent, is—

1. In a car coupler, the combination with the bar, of the head, the two members having interlocking projections adapted to form pivotal connection between them.

2. In a car coupler, the combination with the bar of the head, the two members having interlocking projections formed from a center coincident with the center of the bar, such interlocking parts forming a connection.

3. In a car coupler, the combination with the bar, of the head, the bar being insertible into the head through a portion of its length, and interlocking parts on the bar and head forming a pivotal connection between the bar and head.

4. In a car coupler, the combination with the bar having bosses on its upper and lower walls of the head fitting over the bar and having flanges which engage with said bosses the center from which the bosses and flanges are formed being coincident with the center of the bar.

5. In a car coupler, the combination with the bar and the head having interlocking parts constituting a pivotal connection, of a thimble fitted into an opening in the upper walls of the bar and head, and another thimble fitted into an opening in the lower walls thereof, the thimbles being loose in the openings.

6. In a car coupler, the combination with the bar and the head having interlocking parts forming a pivotal connection, and each having pin-holes, of thimbles fitted in said holes and a pin fitted in the thimbles.

7. In a car coupler, the combination with the bar and the head, of the knuckle pivoted in the head upon a loose pin, the knuckle having shoulders which impinge against the head and against the bar when the knuckle receives a blow.

8. In a car coupler, the combination with the bar and head, of a knuckle pivoted in the head and having an inner arm which extends across the central draft line of the bar when the knuckle is locked, of a pin or fastening device for the said knuckle arm located substantially centrally with the said draft line of the bar, whereby the strains brought on the knuckle are exerted on the bar at substantially its central draft line, the tendency of the said knuckle arm being while under said strains to move outward.

9. In a car coupler, the combination with the bar and a head pivotally connected together with the center of the pivot substantially coincident with the central draft line of the bar, and a knuckle carried by the head and having an inner arm and a fastening device for said inner arm also located substantially coincidently with said central line.

10. In a car coupler, the combination with the bar, the head pivotally connected with it with the pivot coincident with the central draft line, pin openings in the head and bar, thimbles in the openings, and a pin in the thimble, a knuckle pivoted to the head and having an inner arm with an opening to receive said pin.

11. In a car coupler, the combination with the coupling pin, of a bar connected to the pin and detachably connected to the platform, a rock-shaft having one arm adapted to lift said bar and another arm provided with a lifting piece.

12. In a car coupler, the combination with a bar slidingly and detachably connected with the platform, of a rock shaft having an arm engaging with said bar and another arm provided with a lift piece, whereby said bar may be lifted to actuate a coupling pin.

13. The combination with a car coupler and its coupling pin, of a bar 2 connected with the pin and detachably supported by the car structure, and devices to operate said bar to actuate the pin.

14. In a car coupler, the combination with the draw-bar, of the knuckle pivotally connected with the head and having its inner arm adapted to be locked, the bar having shoulders, as R′, projecting outward and beyond the forward face or shoulder as R″ of the knuckle, so that a blow from the incoming knuckle will be resisted by the bar.

15. In a car coupler, the combination with the bar, a head pivoted on the bar and a knuckle pivoted in the head and having an inner arm adapted to be locked to the bar, the bar having projecting shoulders R′, the head having shoulders substantially flush with the said shoulders R′ and the knuckle having the face or shoulder R″ standing back of the shoulder R′.

16. In a car coupler, the combination with the bar having shoulders R′, the head pivoted to the bar and having shoulders P′, and the knuckle pivoted to the head and having its inner arm adapted to be locked to the bar and its face or shoulder R″ formed so as to stand inside of the shoulders R′, the knuckle also having shoulders R and Q.

In testimony whereof I affix my signature in the presence of two witnesses.

RODNEY F. LUDLOW.

Witnesses:
W. M. McNair,
Jas. C. Dawley.